Feb. 17, 1970 E. J. McMAHON 3,496,281
SPACING STRUCTURE FOR ELECTRICAL CABLE
Filed Aug. 6, 1968 6 Sheets-Sheet 1
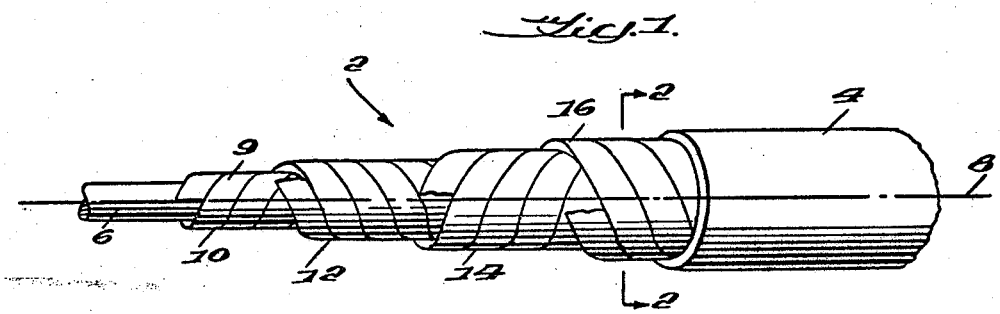
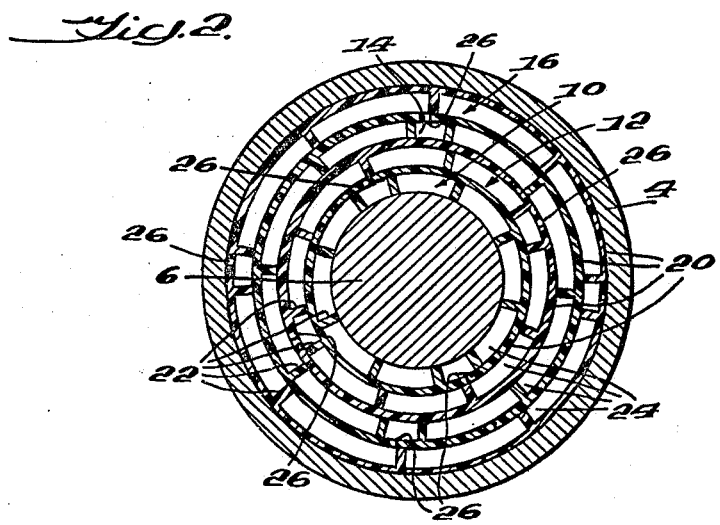
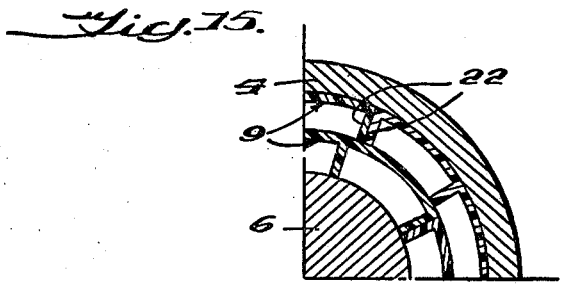

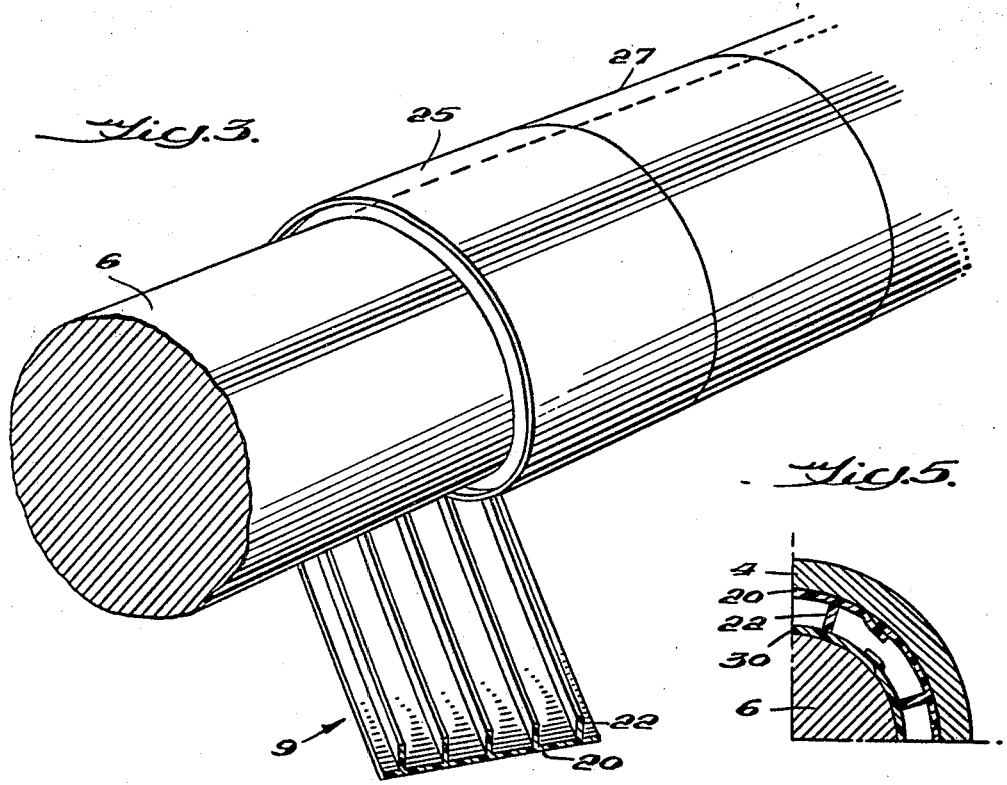
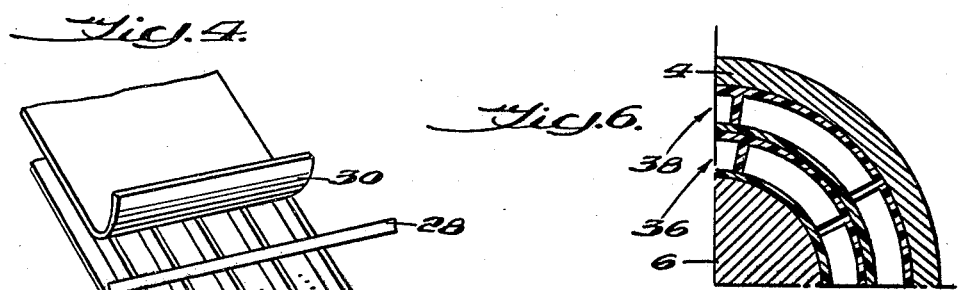
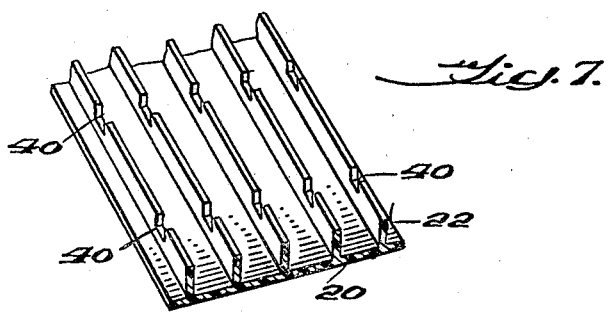

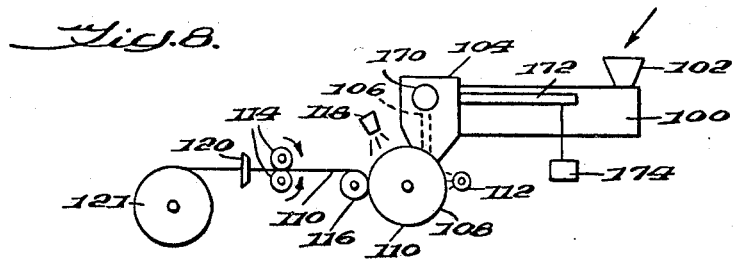
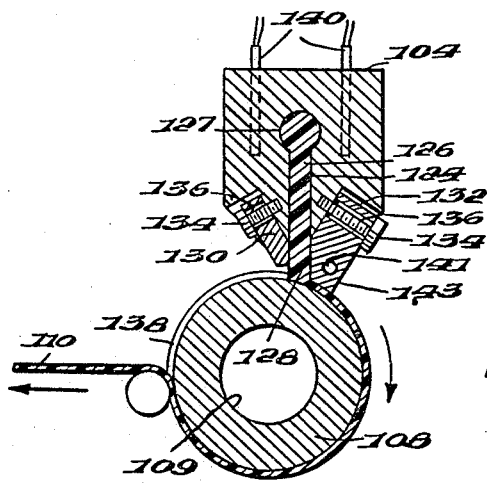
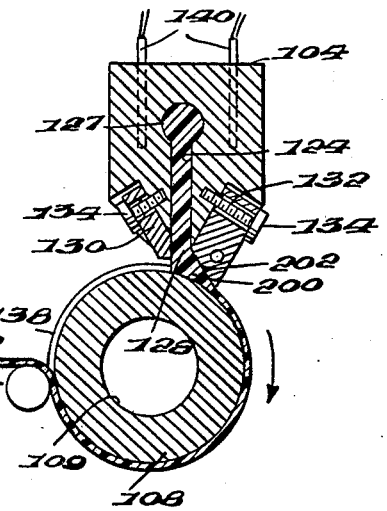
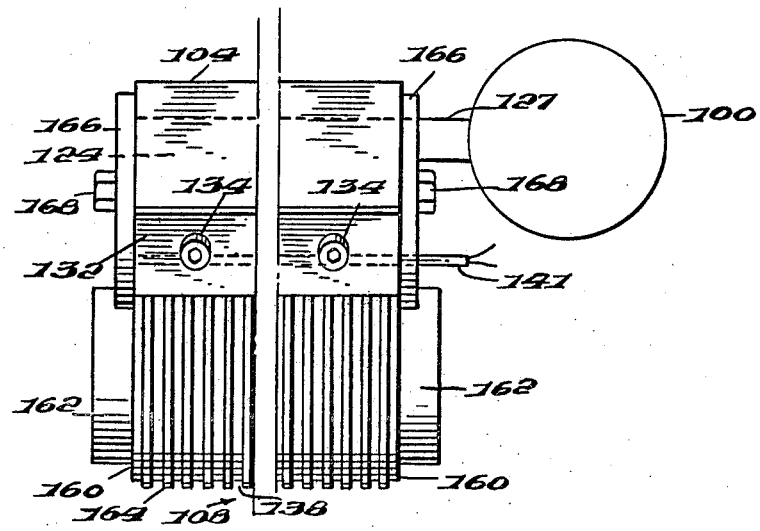

Feb. 17, 1970 E. J. McMAHON 3,496,281
SPACING STRUCTURE FOR ELECTRICAL CABLE
Filed Aug. 6, 1968 6 Sheets-Sheet 4

United States Patent Office 3,496,281
Patented Feb. 17, 1970

3,496,281
SPACING STRUCTURE FOR ELECTRICAL CABLE
Eugene J. McMahon, West Chester, Pa., assignor to E. I. du Pont de Nemours and Company, Wilmington, Del., a corporation of Delaware
Continuation-in-part of applications Ser. No. 623,021, Mar. 14, 1967, and Ser. No. 656,878, July 28, 1967. This application Aug. 6, 1968, Ser. No. 750,501
Int. Cl. H01b 9/04
U.S. Cl. 174—29                                19 Claims

ABSTRACT OF THE DISCLOSURE

Polymeric insulation material in the form of a ribbon of film having ribs extending from at least one surface is wrapped around the inner conductor of electrical cable in the number of continuous or discontinuous layers desired to obtain the electrical strength desired for the line and to position the inner conductor with respect to other inner conductors, if present, and to the shield conductor, or if the cable is unshielded, then to the insulating jacket.

---

This application is a continuation-in-part of Ser. No. 656,878, filed July 28, 1967, and Ser. No. 623,021, filed on Mar. 14, 1967, both filed by the same inventor and both now abandoned.

Electrical cable is used generally for either communications or the transmission of power, with the communications cable usually being low voltage in operation, but sometimes high voltage, and the power cable being high voltage in operation. Generically, however, such cables are considered herein as lines for transmitting electrical energy.

Power cable generally consists of at least one inner conductor spaced from and enveloped by a coextensive running outer conductor which is sometimes called the neutral or ground conductor. Communications cable likewise generally consists of at least one inner conductor and enveloping coextensive running outer conductor spaced from the inner conductor. Generically, the outer conductor of either the power cable or the communications cable is considered herein as the shield conductor.

For either general type of electrical energy transmission line, when the inner conductor and shield conductor are concentric with one another, the inner conductor can be called the central conductor, and the transmission line can be called coaxial cable. It is common, however, for more than one inner conductor to be present within a single shield conductor, with the inner conductors being spaced from each other as well as from the shield conductor. Examples of such energy transmission lines include sector power cables, either belted or shielded, and quadded pair and balanced parallel wire communications cables.

Another type of energy transmission line is the unshielded type, in which instead of a shield conductor jacketting a plurality of inner conductors, a non-conductive or insulating jacket is present. An example of this type of line is the balanced twin lead transmission line, sometimes called parallel two-wire cable, used for communications purposes.

The various types of lines discussed hereinbefore are sometimes combined with lines of the same and/or different type to satisfy the requirements of particular applications.

For all these various types of lines for transmitting electrical energy, whether used individually or in combination, dielectric material is present between the iner conductor and the jacket which may be either a shield conductor or an insulating jacket, and when more than one inner conductor is present, then between each inner conductor, to space and electrically insulate one conductor from another. Two criteria by which such dielectric material are evaluated are electric strength, sometimes called dielectric strength, and dielectric constant. Electric strength is a measure of the ability of the dielectric material to withstand electrical stress and is calculated as voltage at breakdown ÷ thickness of the dielectric material; electric strength determines the maximum voltage the line will withstand for a few microseconds without electrical breakdown. The operating voltage of a line is that voltage just below which corona discharge occurs. This voltage is generally considerably below the electric strength of the material making up the insulation. Dielectric constant is a measure of the capacitance or energy storage of the dielectric material; the higher the dielectric constant, the greater the energy storage and therefore, the shorter the critical length, or length over which the line will transmit electrical energy, of the line. The importance of these criteria will generally depend on the voltage conditions under which a particular line is used.

For high voltage or power applications (about 15 kv. and higher), the dielectric material has been provided in two general ways, either as multiple layers of tape helically wrapped about a conductor or as disc-like spacers spaced along the conductor. Since the tape leaves voids within the insulation, which act as electrical stress risers, the tape wrapping has usually been filled with oil to fill the voids. Such modifications as oil permeable tape, tape with an oil-permeable layer laminated thereto, or tape with widely spaced, shallow grooves for receiving oil, have been disclosed as being useful to insure filling of all voids. A disadvantage of this system of insulation is the presence of a relatively large amount of solid dielectric material (typically at least about 90 percent of the insulation thickness is solid), which gives a high dielectric constant, thereby limiting the critical length of the line. Another disadvantage lies in the general need of applying pressure to the oil filling to insure the filling of voids, which tends to deform the elements within the transmission line, thereby causing undesirable electrical effects.

In the alternative system of using disc-like spacers, while the amount of solid dielectric material is minimized according to the thickness of the spacer and frequency of spacing, other disadvantages exist, such as the lack of a barrier of solid dielectric material at all points between the conductors being insulated from one another. Although the open space between spacers is generally filled with a dielectric gas, the electric strength of the open space, which varies with the gap between conductors, is relatively low, thereby limiting the maximum operating voltage of the line. The spacers themselves adversely affect electrical performance since they lend themselves to tracking which lowers the operating voltage and, in addition, cause longitudinal discontinuities in the electrical field surrounding the conductor encompassed by the spacers, which increases energy loss. Another disadvantage relates to the fabrication and handling nature of lines based on this insualtion system. Because of the unsupported spaces between spacers, the lines must be made relatively inflexible, and therefore, can only be made in relatively short lengths. It is not uncommon for lines of this sort to be assembled in the field. Also, because of their inflexibility, the lines require expansion joints at frequent intervals.

For communications types of applications involving such critical applications as the long distance transmission of signals for sound or audio reproduction (e.g., Community Antenna Television cable), the disc-like spacer system for insulation has been used, with the same disadvantages as for power cable appearing, except for the electrical disadvantages which become less pronounced as voltage decreases. Such lines are, however, susceptible to electrical breakdown under high impulse voltage, such as occurs when lightning strikes nearby. In addition, the electrical discontinuities caused by the spacers adversely affect the reproducibility of the transmitted signal, especially at higher frequency, e.g., above 200 mHz.

In communications cable, for example CATV cable, it is critical that the spacing between conductors, viz, inner conductor and shield conductor, be maintained uniform. This is difficult in the disc-like spacer type of insulation system because of the unsupported areas between spacers. Attempts to overcome this weakness by increasing the bulk of the shield conductor or to provide a strong jacket, both increase cost and decrease flexibility.

Dielectric polymeric material, both blown (foamed) and unblown, has been used to envelop the entire length of an inner conductor in low voltage power applications and communication applications. While this type of insulation system is more resistant to electrical breakdown than the disc-like spacer system, the large amount of polymeric material present, even when blown, gives a high dielectric constant, thereby decreasing the critical length of the line. In this system of insulation, the dielectric material is applied by extrusion over a conductor. It is difficult to maintain the conductor in the center of the extruded coating for long lengths, as required for good signal reproduction in such applications as CATV. One method of improving centering is to increase the size of the conductor, because the smaller the conductor the more is its tendency to wiggle within the extruded coating. Increasing conductor size, however, causes the remaining elements of the line to be increased in size, at a penalty of both cost and flexibility. Another disadvantage of this type of insulation system, particularly wherein foamed dielectric material is used, is the relatively low transverse resilience of the transmission line. Such lines when partially crushed as may occur in handling or use, do not regain their original cross-section upon release of the crushing force. Thus, the distortion is transmitted signal, caused by the crushing, remains indelibly a part of the transmission character of the line.

The present invention provides dielectric material in an improved form of spacing and insulation between conductors in lines for transmitting electrical energy, including but not limited to, the various cables hereinbefore described. The solid structure comprises a ribbon of dielectric polymeric material, with the ribbon being composed on a continuous uniplanar film and a plurality of ribs extending from at least one surface of the film. The ribbon is employed as a wrapping around a conventional inner conductor and as such provides effective electrical insulation and spacer structure between other inner conductors and between the conventional jacket of shield conductor or insulation. This ribbon possesses the advantageous aspects of both the solid and fluid dielectric materials of the prior art without the significantly detrimental aspects thereof. Transmission lines using this ribbon as the dielectric material spacing structure are flexible and strong in the transverse direction, with the ribbon being applicable by ordinary manufacturing operations.

In one embodiment of this invention, the wrapping of the ribbon around the inner conductor forms a discontinuous layer while in another embodiment the wrapping forms a continuous layer. A discontinuous layer can be formed by wrapping the ribbon in an open helix around the inner conductor. One form of continuous layer is that which is obtained by wrapping the ribbon in a closed helix around the inner conductor. Another form of continuous layer is the wrapping of the ribbon in longitudinally folded or cigarette paper wrap fashion around the inner conductor. The film that is present at all points between the inner conductor and shield conductor in the continuous layer embodiment is an effective barrier against breakdown caused by high impulse voltages. The spaces between ribs of the ribbon are available for filling with air or a fluid or higher dielectric strength such as gas or oil. In either the discontinuous layer or the continuous layer embodiments, a plurality of such layers of ribbon can be used. When helical wrapping is used, the direction of helical wrap in each successive layer can either be reversed or in the same direction. Film is present at all points between the inner conductor and shield conductor, when for a plurality of layers of open helical wrapping, the turns of each succeeding layer are offset from the turns of the preceding layer in the same direction, i.e., the turns of one layer straddle the space between the turns of the preceding layer in the same direction, providing at least one rib on each side of the space. The same kind of offsetting can be employed for continuous layers of wrapping. One or more layers of one type of wrapping can be combined with one or more layers of wrapping of another type.

Surprisingly, when a sufficient number of layers of ribbon are present to divide the gap at all points between the inner conductor and shield conductor into at least three concentric spaces, the corona inception voltage (CIV) is increased rather than decreased as would be expected from experience with single solid surfaces present between such conductors which show a decrease in the corona inception voltage. Thus, the ribbon can be used to increase the maximum operating voltage of a line merely by increasing the number of layers of such ribbon. This surprising result is obtained without sacrifice of dielectric constant.

These and other embodiments of this invention will be described more fully hereinafter with reference to the accompanying drawings, in which:

FIG. 1 is a partially cut-away view of a length of transmission line incorporating features of this invention;

FIG. 2 is an enlarged cross-section taken along line 2—2 of FIG. 1;

FIG. 3 is an enlarged perspective view of part of one layer of closed helical wrapping of this invention;

FIG. 4 shows another embodiment of ribbon for use as helical wrapping in this invention;

FIG. 5 is a partial cross-section of a transmission line in this invention employing one embodiment of closed helical wrapping with the ribbon of FIG. 4;

FIG. 6 is a partial cross-section of a transmission line employing another embodiment of closed helical wrapping with the ribbon of FIG. 4;

FIG. 7 is a perspective view of another embodiment of ribbon for use in the present invention;

FIG. 8 shows in diagrammatic side elevation apparatus for making ribbon for use in the present invention;

FIG. 9 shows in cross-section one embodiment of molding apparatus for use in the apparatus of FIG. 8;

FIG. 10 shows in cross-section another embodiment of apparatus for use in the apparatus of FIG. 8;

FIG. 11 shows an embodiment for laterally confining molten thermoplastic resin in an embodiment of roll pattern for making ribbon useful in the present invention;

FIG. 15 is a partial cross-section of a transmission line of this invention employing another embodiment of closed helical wrapping with ribbon of the type shown in FIG. 3;

Figure 12:
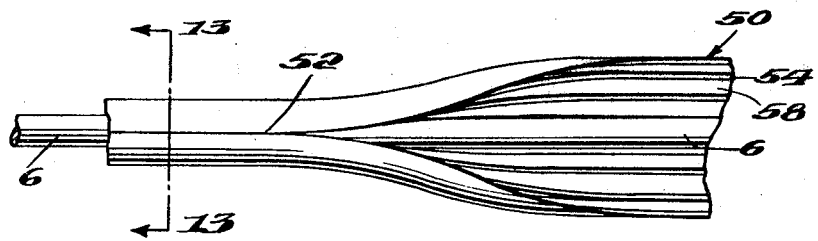
FIG. 12 is a partially cut-away view of ribbon being wrapped in cigarette paper wrap fashion about a central conductor.

Referring now to the drawings, FIG. 1 shows a transmission line 2 consisting of a shield conductor 4 in the form of a tube and an inner, or in this case, a central conductor 6 having a common axis 8 with that of the shield conductor. The transmission line 2 is thus a coaxial cable. Central conductor 6 is covered with a first layer 10 of helically wraped ribbon 9. This layer is covered with another layer 12 of the same ribbon helically wrapped in the opposite direction, which is in turn covered by a third layer 14 of the same ribbon helically wrapped in the same direction as the ribbon of layer 10. The third layer 14 is covered by a fourth layer 16 of ribbon 9 helically wrapped in the opposite or reverse direction, which is the same direction of wrap of layer 12. This plurality of layers of helically wrapped ribbon 9 forms the spacing structure and insulation between the central conductor 6 and the shield conductor 4 as best shown in FIG. 2.

The formation of a helically wrapped layer of ribbon and the ribbon itself is shown in greater detail in FIG. 3. The ribbon in this embodiment is composed of continuous uniplanar film 20 and a plurality of parallel ribs 22 extending perpendicularly from one surface of the film and along the length of the ribbon. The ribbon is helically wrapped around the central conductor 6 as shown in FIG. 3 in such a way that the tops of the ribs 22 face inwardly. The films of the turns 25 and 27 of the ribbon are in abutting relationship to produce a closed helix or continuous layer of ribbon. The helical wrapping of each the layers 10, 12, 14 and 16 of FIG. 1 is slightly open to form discontinuous layers as will be explained hereinafter, however, this wrapping can be in the form of closed helices. The ribbon can be wrapped so that the ribs 22 face outwardly and the film faces inwardly. In another embodiment, the ribs 22 can extend from both surfaces of the film.

To return to the embodiment of FIG. 1, the plurality of layers of this helically wrapped ribbon presents an alternating sequence of ribs 22 and films 20 proceeding from the central conductor 6 to the shield conductor 4 as best shown in FIG. 2.

The ribs 22 space the films from the central conductor and from the film of the preceding layer to define spaces 24, which are in the form of a plurality of helical channels laterally defined by the ribs 22 of each ribbon. These spaces 24 are filled with a dielectric fluid as may be desired for high voltage application or with air. Preferred dielectric fluids are electronegative gases, such as SF₆ (sulfur hexafluoride, a fluorochemical) under pressure such as of 2 atmospheres or higher or fluorinated hydrocarbon gases, such as the Freons, which may be used under pressure depending on which gas is used. Gases other than air or dielectric gases can be used, such as nitrogen under pressure. Oil can be used as a dielectric fluid, but is less desirable than a dielectric gas because of the large proportion of open spaces between conductors, provided by the ribbon. Thus, the problems associated with oil-filled cable, such as voids and deformation resulting from the use of pressure to eliminate voids, can be avoided by using gas-filled cable provided by the present invention, in which the electrical attributes of oil filled cable are either equalled or exceeded. As compared to existing gas-filled power cable, those of the present invention are superior in such aspects as electrical character and handling character.

The helical wrapping to form the layers 10, 12, 14 and 16 is done in such a way that the edges of the ribbon of a preceding layer are covered by film of the next layer. As shown in FIG. 2, the longitudinal edges of the film of each layer are not quite abutting one another, but instead are separated from each other to form small spaces 26. The helical wrapping of layers 10, 12, 14 and 16 is thus slightly open. The spaces 26, i.e., the helical turns of layer 10, are circumferentially offset from the spaces 26 or helical turns of the next layer 14 which has a helical wrap in the same direction of layer 10. The same circumferential off-set is provided between the helical turns of the layers 12 and 16.

This off-setting of helical turns provides at least one film 20 at all points between the central conductor and the shield conductor 4. For a dielectric break-down of the fluid or air to occur, the current path, instead of passing directly between the shield conductor and the central conductor, has the much longer path; namely, following a zig-zag course from space 26 to space 26 of the layers of ribbon in order for the current from one conductor to reach the other. This much longer path serves to increase the effective thickness used to calculate dielectric strength. Since dielectric strength does not change noticeably, the voltage at breakdown is increased, thereby permitting the cable to be used at higher voltages. For example, in a dielectric breakdown test, the breakdown for a free air gap of 0.25 inch between electrodes is 60 volts per mil. The use of five layers of ribbon in this same air gap, with the turns of each layer being in the same direction and ⅓ off-set from one another, increases the stress required for breakdown to 180 volts per mil. The normally relatively high power loss associated with the use of high, relative to gas, dielectric constant, polymeric material is minimized by minimizing the amount of polymeric material that is used to make the ribbon.

In another embodiment of this invention, as shown in FIG. 4, film of dielectric material is laminated to the tops of the ribs 22 of the ribbon 9. This may be done in the case when the ribbon and other film are of dielectric thermoplastic polymeric material by heat-softening the tops of the ribs 22 with a heat source such as a burner 28 and immediately bringing into contact with the heat softened tops, the film 30 of thermoplastic polymeric material. This can be done on a continuous basis by moving the ribbon 9 and the film 30 in the direction indicated while maintaining their meeting point approximate to the burner 28. Pressure can be applied across the thickness of the resultant ribbon in order to strengthen the bond between the film 30 and the tops of the ribs 22 by passing the resultant laminate between the nip of a pair of oppositely rotating rolls spaced apart slightly less than the thickness of the laminate. In place of the burner 28 a freshly extruded film of dielectric thermoplastic polymeric material can be laminated to the tops of the ribs 22 by the application of pressure alone. The resultant laminate is used in substantially the same manner as the ribbon 9, with the additional film 30 providing increased transverse strength to the transmission line.

The laminate of films 20 and 30 and ribs 22 can be used to form a single continuous layer of closed helical wrapping between the central conductor 6 and the shield conductor 4 as shown in FIG. 5. In this embodiment, the edges of the film are overlapped so as to present at least one solid surface of dielectric film at all points between the conductors 4 and 6. Instead of overlapping, the film edges can be abutting one another.

The laminate of FIG. 4 can also be used to form a plurality of layers of helical wrapping, such as layers 36 and 38 of FIG. 6, with the direction of wrap of these layers being reversed from one another in the same manner as layers 10 and 12 of FIG. 1. In another embodiment, the plurality of layers of helical wrapping of the ribbon 9 or laminate of FIG. 4 may have the same direction of wrap, with the turns of each successive layer being off-set from the turns of the preceding layer in the same direction so as to prevent a straight-line path for electrical breakdown from occurring.

It is preferred that there is at least one continuous layer of film in the space between the central conductor and the shield conductor, with this film being spaced from each of these conductors. The embodiment of FIG. 6 provides this condition for the laminate of FIG. 4. The embodiment of FIG. 15 provides this condition when the ribbon 9 is used by itself.

The spaces 26 between helical turns of ribbon permit some sideways movement of the ribbon to thereby permit flexibility of the transmission line. The presence of this spacing between ribbon edges of the same layer is compensated for by the plurality of layers of ribbon which prevent a straight-line path between conductors 4 and 6 for break-down of the dielectric fluid or air. If the film edges defining spaces 26 were abutting or overlapping the spaces would no longer be present, and the wrapping of FIG. 2 would be in the form of closed helices. One representative form of overlapping of films is as shown in FIG. 5. Alternatively, the overlapping edges can be complementarily beveled so as to provide a seam which is subsantially the same thickness as the film. Another embodiment of abutting edges is to have these edges terminate in ribs, such as ribs 22 as shown in FIG. 15. This embodiment tends to prevent sideways movement of closed helically wrapped tape.

In still another embodiment of this invention, transverse notches 40 are provided in the ribs 22 as shown in FIG. 7. These notches are provided at the longitudinal spacing and to the depth desired and can terminate intermediate the surface of film 20 and the tops of the ribs 22 as depicted in the drawing. The resultant modified ribbon is used in the same manner as hereinbefore described with respect to the ribbon embodiments of FIGS. 3 and 4.

The helical channels laterally defined by the ribs 22 of the ribbon can be connected to a pump (not shown) which can be used to continuously flow air or dielectric fluid along the transmission line, thus providing cooling as well as insulation. Any moisture which may enter the transmission line would also be removed by providing a source for drying the fluid in the pumping circuit. The ribbon embodiment of FIG. 7 is particularly useful in this aspect by providing communication between the various channels, in case one or more of the channels are blocked. Another benefit of the embodiment of FIG. 7 is that less polymeric material is present than when the ribs are continuous, thereby further loawering the dielectric constant of the insulation structure.

Figure 13:
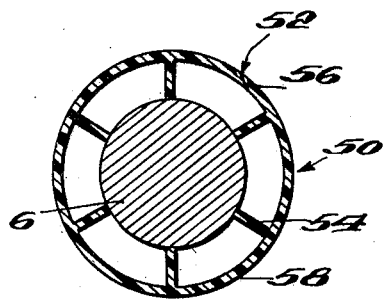
FIG. 13 is an enlarged cross-section taken along line 13—13 of FIG. 12.

Instead of helical wrapping, the ribbon can be wrapped around the inner or central conductor in cigarette paper wrap fashion as illustrated in FIG. 12 wherein ribbon 50, which is similar to ribbon 9, is progressively wrapped around the central conductor 6 so as to form a seam 52 of the longitudinal edges of the ribbon joined together, the seam extending parallel to the axis of the conductor. The ribs 54 of the ribbon 50 also extend parallel to the axis of the conductor and are directed inwardly against the surface of the conductor as shown in FIG. 13. The seam 52 can be in the form of complementarily beveled abutting edges 56 shown in FIG. 13 or other form of abutment or overlap such as shown in FIGS. 5 and 15 to form a continuous layer of wrapping. The edges can be joined together to form the seam 52 by heat bonding, which does not require the introduction of a material of another electrical character, such as an adhesive, into the system in order to obtain the bonding. The ribbon can be applied continuously to the conductor 6 by moving both in the same direction and at the same speed and by applying localized heating to the edges of the ribbon 50 just prior to coming together into seam 52. The heating is sufficient to melt the portions of the edges which come into contact with one another, whereby upon such contact and subsequent cooling, the heat bond is formed. These techniques can also be applied to join the edges of ribbon wrapped in a closed helix. The wrapping in cigarette paper wrap fashion can be done with stationary conductor 6 and ribbon 50.

The cigarette paper type of wrap does not create the electrical discontinuities in the field surrounding the conductor so wrapped, which discontinuities are characteristic of insulation contructions involving spacers spaced along a conductor.

The central conductor 6 can be coated with a dielectric polymeric material which is heat-bonded to the tops of the ribs 54 in order to adhere them together, is desired, in order to aid in stabilizing the ribs 54 against the central conductor. Alternatively, for larger conductors, the embodiment of ribbon shown formed in FIG. 4 can be used. The ribbon 50 can be notched similar to the manner shown in FIG. 7, if desired, for the purpose of providing communication between the channels formed between the film 58 and conductor 6, should blockage occur.

Figure 14:
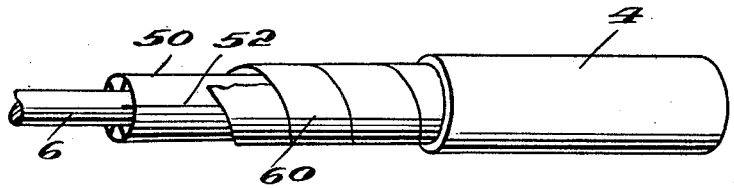
FIG. 14 is a partially cut-away view of another embodiment of transmission line of this invention.

A plurality of layers of ribbon wrapped in cigarette paper wrap fashion can be used, with the longitudinal seam of one layer either coinciding with or being off-set from an adjacent layer. When more than one layer of ribbon is used to form a transmission line of this invention, one or more layers can be formed by cigarette paper wrap and the remainder by helical wrap. For example, the layer adjacent the central conductor 6 can be ribbon 50 in cigarette paper wrap fashion and the layer adjacent the shield conductor 4 can be ribbon 60, similar to ribbon 9, in helical wrap fashion, as shown in FIG. 14. An opposite combination of wrapping style can be used, or variations thereon wherein one or more layers of one style of wrapping are sandwiched between or alternated with layers of the other style of wrapping which can be used.

The number of layers of wrapping of ribbon used in the present invention will depend primarily on the total insulation thickness required for a specific voltage stress design and the particular ribbon employed.

In the case of communications cable, such as can be used for CATV, the number of layers for a particular ribbon thickness determines the impedance of the cable. By decreasing rib height for the ribbon (while still maintaining at least 70 percent open space between inner and outer conductor) and increasing the number of layers of ribbon, the flexibility of the cable can be increased without change in impedance. In other words, the use of ribbon according to the present invention provides freedom in choosing an electrical design for a particular application, which can be met by merely changing rib height or the number of layers of ribbon used, without alteration of the cable fabrication equipment or technique.

The use of multiple layers of ribbon wrapped in cigarette paper wrap fashion, with the ribs of the inner layer stabilized against the inner conductor, as described hereinbefore, provides a cable which is particularly useful in such communications applications as CATV. One such cable is shown in FIG. 23, wherein a central conductor 6 has a coating 300 of dielectric polymeric material, to which the ribs 54 of an inner layer of ribbon 50 (wrapped in the manner shown for FIGS. 12 and 13) are bonded.

This bonding is obtained by bringing the ribs into contact with the coating immediately after applying the coating by extrusion to the central conductor or by supplementary heating of the coating and/or ribs, followed by bringing them together. One or more layers of ribbon 302 (only one shown), which can be the same as ribbon 50, are, in turn, wrapped in cigarette paper fashion around the inner layer, followed by a shield conductor 304. The ribs 306 of ribbon 302 are not bonded to ribbon 50, whereby the ribbons 50 and 302 are free to move with respect to each other. Thus, freedom of movement provides high flexibility to the cable without loss of reproducibility of the transmitted signal. The cable also has high transverse strength and resilience, i.e., when transversely deformed, the cable returns to its original shape without loss of desired electrical character. The coating 300 is tightly fit over the conductor 6, but is not necessarily bonded thereto.

Figure 23:
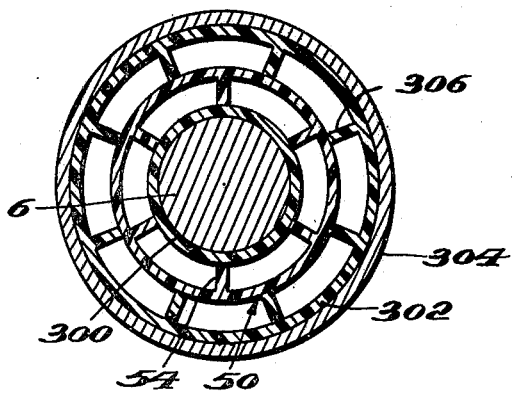
FIG. 23 is a cross-section of still another transmission line of the present invention.
Figure 24:
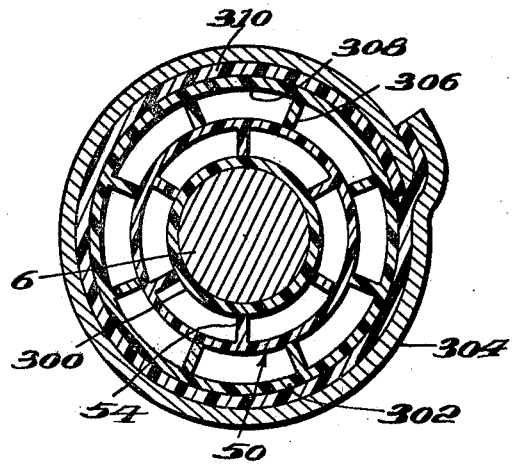
FIG. 24 is a cross-section of another embodiment of the transmission line of FIG. 23.

Another embodiment is shown in FIG. 24, which is the same as FIG. 23 except that the outer layer of ribbon 302 has its film 308 bonded to a coating 310 of dielectric polymeric material which is self-adhered to the shield conductor 304. Thus, each electrical component is bonded to a portion of the primary insulation structure provided by the ribbons, but the insulation structure is divided into layer portions which are unbonded to each other. In a preferred aspect, the shield conductor 304 is a foil of conductive material onto which the polymeric material is coated in conventional fashion, and the resultant laminate is wrapped either in helical or cigarette paper fashion about the outermost layer of ribbon. Heating the resultant wrapped structure through the shield conductor to briefly melt the coating 310 and film 308 brings about bonding between them. The dielectric polymeric materials used to form coatings 300 and 310 can be any dielectric polymeric material which will heat bond to their respective adjacent layers of ribbon. Preferred dielectric polymeric materials for forming the coatings include the ionomers and acid copolymers described in the Canadian and British patents, respectively disclosed hereinafter. Generally, the coatings 300 and 310 have a thickness of less than 20 mils, and more often less than 10 mils.

The embodiments of FIGS. 23 and 24 can have any number of intermediate layers of ribbon 50. In the case of small diameter inner conductors, the innermost layer of ribbon can be bonded to the coating on the conductor and the next innermost layer of ribbon can be bonded to the film of the innermost layer, with the provision of at least one additional layer of ribbon unbonded to the others.

Use of multiple layers of ribbon according to the present invention has led to the discovery of a surprising phenomenon in high voltage application. Ordinarily, when a solid dielectric barrier is introduced between spaced electrodes of opposite polarity, the operating voltage of the line containing the electrodes is reduced. This reduction may not be detrimental in using the line for low voltage applications, such as for communications, but is detrimental when the line is operated at high voltages for power purposes. Dielectric breakdown is generally preceded by corona discharge from one of the electrodes. The voltage at which this discharge is first detected is called the corona inception voltage (CIV). Instead of following the trend of reduced corona inception voltage obtained for the introduction of a single solid dielectric barrier between electrodes, the presence of multiple dielectric barriers dividing the gap at all points radially between the inner conductor and the shield conductor into at least three spaces concentrically arranged increases the CIV and thereby the operating voltage of the line. The dielectric barrier is providede by the film of the ribbon, and the ribs extending from the surface of the film space the film of one layer of ribbon from the film of the ribbon of an adjacent layer.

The number of layers of ribbon wrapped around the inner conductor required to obtain the minimum of three spaces will depend on the manner in which the ribbon is wrapped. When the wrapping is in continuous layers, three such layers are sufficient (provides two layers of film spaced from each other and from each electrode). For example, as few as three continuous layers of ribbon (50 mils thick composed of 4 mil thick film having ribs ⅛ inch apart, 10 mils wide and 46 mils high) increase the corona inception voltage over a free air gap at atmospheric pressure by about 7%. As the number of layers increases so does the corona inception voltage. For six continuous layers of the same ribbon, the increase in corona inception voltage is about 25 percent. Use of the cigarette paper wrap for forming the layers leads to higher wrapping speeds, longer lengths, and greater ease in building up the multiple layers of ribbon to the number desired, as compared to helical wrapping. The use of at least five continuous layers of ribbon to divide the space between inner conductor and shield conductor into at least five concentrically arranged spaces is a preferred embodiment for power cable of the present invention.

Wrapping in discontinuous layers, such as open helical wrapping in offset layers, is somewhat less effective, depending on such factors as degree of openness of the wrap, the degree of offset of succeeding layers, and the direction of wrap of the layers relative to each other. Generally, at least either 4, 5 or 6 such layers are required to provide at least 2 layers of film spaced from each other and from each conductor at all points between the conductors; by way of example, the embodiment of FIG. 2 provides the minimum of three spaces in the gap between the conductors.

To obtain the maximum benefit in increased operating voltage, resulting from increased path length for breakdown and increased CIV, it is preferred that if helical wrapping is used, whether open or closed, the direction of wrap in each successive layer be in the same direction, with the turns in each successive layer being about ⅓ to ½ (width of the ribbon) offset from one another. This construction can be strengthened by an outer layer and/ or one or more intermediate layers of helical wrapping in the opposite direction.

While the problem of corona discharge is generally not encountered in the transmission of DC power, the use of ribbon as hereinbefore described provides advantages not present in currently used oil-filled kraft paper insulation; namely, a much higher resistivity which is relatively temperature insensitive. This advantage is not limited to the use of oil, but can be obtained with gas filling as well.

Use of the ribbon as hereinbefore described provides advantages to applications under special conditions. For example, instead of gas filling for the cable, the cable can be evacuated to 0.1 mm. Hg or less, which removes ionizable gas, thereby increasing the corona inception voltage of the line. Operation of the line under such vacuum is made possible by the transverse strength of the line provided by the ribbon. In addition, the film of the ribbon acts as a solid barrier to any electron emission from the inner conductor.

The ribbon wrapping also can be advantageously used in cables operated near or at cryogenic temperatures because of the thermal insulation provided by the ribbon. In addition, the channels formed between ribs of the ribbon can be used to carry cooling liquid.

Figure 22:
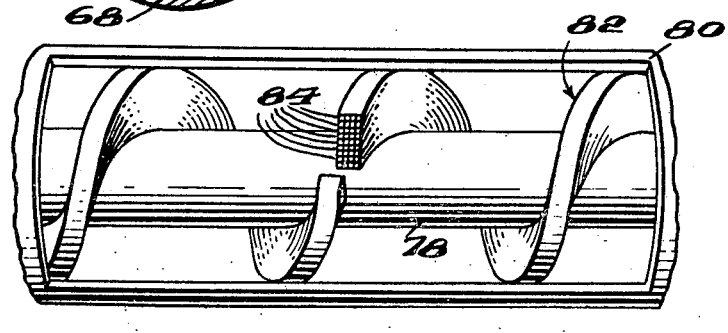
FIG. 22 shows a partially cut-away view of a transmission line formed with wrapped discontinuous layers of ribbon.

A still further aspect of the present invention is the use of the ribbon disclosed herein hereinbefore to replace the multiple layers of helically wound tape used in the "Styroflex" cable construction. As shown in FIG. 22, this type of construction generally comprises central conductor 78 coaxially spaced from a shield conductor 80 by an open helical wrapping 82 which normally consists of coextensive layers of tape. According to the present invention, this tape is replaced by ribbon, such as ribbon 9, whereby the wrapping 82 consists of multiple layers 84 of such ribbon; for example, seven coextensive layers as shown for the cut-away portion of the wrapping 82 in FIG. 22. For simplicity, a layer of reversed open-helically wrapped tape which may be sandwiched between the outer layer of wrapping 82 and conductor 80 has been omitted; but this, too, can be replaced by the ribbon disclosed herein. The layers 84 of ribbon can be laminated to one another by such methods as heat bonding between layers. The open helix of the "Styroflex" construction differs from the open helix of the wrapping of layers 10, 12, 14 and 16 of FIG. 2 by not having at least one layer of film present at all points between the conductors of the cable.

With respect to the other components of transmission lines constructed according to the present invention, the inner conductor can vary in cross-sectional shape from the circular shape, and can be hollow and/or of stranded wires instead of solid, and the ribbon will still generally conform to the surface of the conductor. The inner conductor can also be made of a plurality of wires encased in a wrapping or coating of semi-conductive material, such as polyethylene filled with carbon black, in order to even out the electrical field surrounding the central conductor. For high voltage application, it is preferred that the inner conductor is coated with an insulating material, such as a coating of dielectric polymeric material. The ribbon insulation is applied over this coating. The shield conductor can be in such forms as a solid tubing of annular cross-section or tubing formed by wrapping conductive material helically or otherwise around the outer layer of ribbon. The shield conductor can also be corrugated to aid in the flexibility of the transmission line. The shield conductor can have a layer of semi-conductor material. Another form of shield conductor is that which is composed of a layer of semi-conductor material having conductor wires positioned on the outer surface thereof whether in a plurality of straight paths or helical paths. The conductive material for use as both the shield conductor and central conductor will be the conventional conductor materials, such as aluminum, copper or sodium (for use as an inner conductor). The shield conductor of all embodiments will generally be jacketted in an insulating material, such as polyethylene, in sufficient thickness, e.g., ¼ inch, to as much as possible, exclude moisture from laterally entering the transmission line and to retain the dielectric fluid therein should it be a gas.

The transmission line of this invention can be made by standard manufacturing techniques such as related to wrapping and extrusion jacketting. The resultant transmission line is sufficiently flexible and uniformly strong in transverse strength to be capable of withstanding reeling and reasonable handling without disturbing the disposition of the conductors. Thus, on site application of the insulation is not necessary. The insulation of the present invention contributes to the physical strength of the line and does not require large size conductors or special jacketting for this purpose.

The ribbon for use in wrapping either in helical or cigarette paper wrap fashion in accordance with this invention can be made by standard extrusion techniques employing an extrusion die opening having approximately the shape of the cross-section desired for the ribbon. The number and depth of the ribs and film thickness can be varied as desired within machine capability limits.

A preferred method and apparatus for making the ribbon is described hereinafter with reference to FIGS. 8 to 11. In FIG. 8 is shown an extruder 100 equipped with a hopper 102 for receiving thermoplastic resin and melting it under pressure. A die 104 receives the pressurized molten resin through its rear (hidden) side from the extruder and passes the resin along a path 106 which terminates in an outlet in pressure-seal relation with a rotating patterned roll 108 and directs the resin substantially free of pressure drop and in the absence of air into the pattern of the roll. The roll 108 continuously moves the molten resin away from the outlet of path 106, thereby forming a continuous molded web 110 having a pattern which is complementary to that of the roll. The web 110 is chilled by a flume or water spray 112, and after sufficient contact with the roll 108 which is internally cooled, the cooled web is removed from the roll by take-off rolls 114 aided by a stripper roll 116 and, optionally, mold release agent applied by spray nozzles 118 to the surface of the roll prior to passage under die 104. Longitudinal dividing or trimming of web 110 is accomplished, if desired, by one or more blades 120 positioned between the take-off rolls 114 and one or more reels 121 (only one shown).

To further describe the die 104 and patterned roll 108, which comprise the molding apparatus, FIG. 9 shows one embodiment in which die 104 contains a cavity 124 serving as path 106 (FIG. 8) and which is supplied with molten thermoplastic resin 126 through inlet pipe 127 by extruder 100. Die 104 is heated to a temperature above the resin melting temperature of the particular resin being used, by electrical heating elements 140 extending into corresponding wells in the die. The resin melting temperature is the minimum temperature at which a fresh sample of resin leaves a molten train as it is moved slowly across a heated metal surface. This is also sometimes called the stick temperature. Cavity 124 terminates in a slot-shaped outlet 128 extending across the surface of roll 108. The rearward and forward edges of outlet 128 are defined by a die plate 130 and a doctor blade 132, each adjustably spaced from roll 108 and secured to die 104 by bolts 134 extending through slots 136. The pressure upon the molten resin 126 in the cavity forces the resin through outlet 128 and into the roll pattern represented by circumferential grooves 138 (only one shown). The cavity 124 and outlet 128 are substantially free of constriction so that the pressure on the resin at the surface of roll 108 is substantially the same as the pressure on the resin in cavity 124.

The grooves 138 mold the ribs extending from one surface of the web 110. The opposite surface of the web is formed by doctor blade 132 which is adjustably spaced from roll 108 to give the web thickness desired. The web 110 is thus in the form of ribbon such as shown in FIG. 3, with the longitudinal dividing by blades 120 giving the ribbon width desired. The doctor blade 132 can be notched to form ribs on the opposite surface of the web.

In further detail doctor blade 132 is heated by an electrical heating element 141 usually to a temperature which is equal to or greater than the temperature maintained by die 104. The outer face 143 of the doctor blade departs sharply from the path of web 110 so as to avoid sticking of the web to the hot doctor blade. Roll 108 is cooled to a temperature which is at least about 10° C. less than the melting temperature of the resin being molded, such as by passing a cooling medium through an interior passage 109.

In FIG. 10 essentially the same equipment arrangement as in FIG. 9 is used except that slot-shaped outlet 128 includes a wedge-shaped passage 200 extending in the direction of rotation of roll 108. The wedge-shape of the passage 200 is formed by doctor blade 132 having a slant surface 202 facing the roll 108. Movement of the surface of roll 108 past the opening 128 drags molten resin into the passage 200 wherein the flowing resin is forced into the pattern of roll 108. This drag flow pressure created in the passage 200 at the surface of the roll augments the pressure on the resin within cavity 124 of the die.

The wedge-shaped passage 200 can be of any configuration which augments the molding pressure supplied by the extruder. Generally, the passage 200 will take the form of converging surfaces, with the roll pattern forming one of these surfaces. The pressures required on molten thermoplastic resin in cavity 124 can be less than the full extrusion pressure of the extruder, depending upon which resin is employed and upon operating conditions. The pressure in the cavity 124, however, is substantially the same as the pressure on the resin coming into contact with the pattern of the roll surface. When such pressure is insufficient, the drag flow arrangement of FIG. 10 can be used to increase the force present for continuously filling the pattern with molten resin.

The molding apparatus of FIGS. 9 and 10 can be provided with water spray 112 and mold release spray nozzles 118 as shown in FIG. 8.

A pressure-seal relation between the outlet 128 for the molten thermoplastic resin and roll 108 is maintained so that the pressure on the resin in cavity 124 and the drag flow pressure, when the apparatus of FIG. 10 is employed, are available to force the resin into the pattern of roll 108 on a continuous and high speed of production basis. The pressure-seal relation is obtained, in part, by adjusting the doctor blade 132 to constrict the flow space for the resin as it leaves outlet 128 and by having a sufficient rate of web formation for the viscosity of the particular resin being molded to prevent back flow under the die plate 130 which is generally spaced 2 to 10 mils from the surface of roll 108.

FIG. 11 shows, in indeterminate width, means for laterally confining the molten thermoplastic resin as it leaves opening 128 so as to complete the pressure-seal relation. In FIG. 11, the doctor blade 132 is shown in operative position and provided with heating element 141. The lateral surface of the roll 108 is provided with a pattern, shown in enlargement, of circumferential grooves 138 terminating at shoulders 160 formed between the surface of the roll and cylindrical ends 162 of reduced diameter extending from each end of the roll. The molten resin from cavity 124 is molded into a web which extends entirely across the roll pattern. Further sideways flow of the resin, however, is prevented by a pair of end plates 166 adjustably spaced from roll 108 by bolts 168 passing through slots (not shown) in the end plates and tightened into die 104. The end plates 166 each lie close to the shoulders 160 and have a lower arcuate surface lying close to the corresponding surface of cylindrical ends 162. This close spacing, on the order of several mils, permits a small amount of molten resin to enter the tortuous path around shoulders 160 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 166 and roll 108. The end plates 166 also form the lateral sides for cavity 124 and the die outlet 128 which is coextensive therewith.

Means can also be provided for changing the spacing between the die 104 and the roll 108 to compensate for pressure fluctuations caused by extruder 100 so as to maintain a constant force on the resin entering the roll pattern. Exemplary of such means is the pivotal mounting of die 104 about a stub shaft 170 which is on center with the feed line between extruder 100 and the die, and providing a lever arm 172 having the desired weight 74 suspended therefrom as shown in FIG. 8. Excessive molding pressure is relieved by the die 104 rotating away from roll 108. Upon return of the pressure to normal, weight 174 restores the die 104 to its former position to produce web of the desired thickness.

Figure 16:
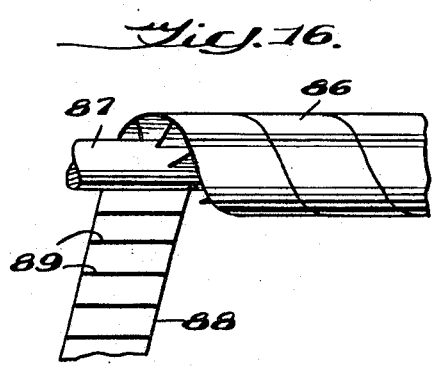
FIG. 16 shows schematically, wrapping an inner conductor with still another embodiment of ribbon.
Figure 17:
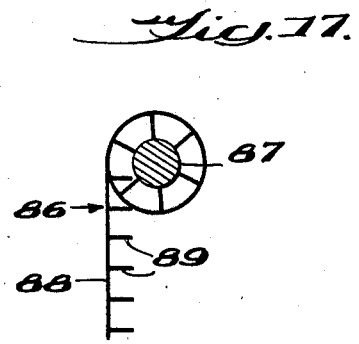
FIG. 17 shows an end view of the conductor of FIG. 16.
Figure 18:
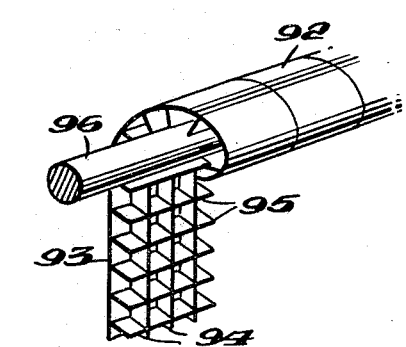
FIG. 18 shows schematically, wrapping an inner conductor with still another embodiment of ribbon.
Figure 19:
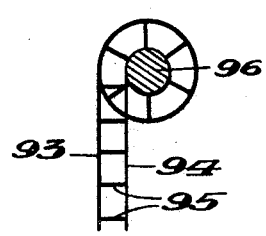
FIG. 19 shows an end view of the conductor of FIG. 18.
Figure 20:
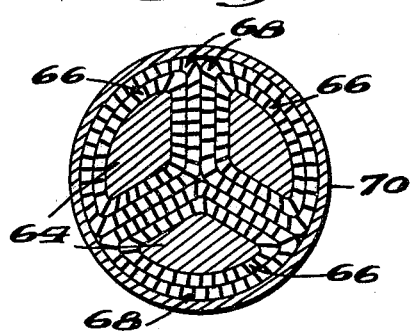
FIG. 20 is a schematic cross-section of a sector cable incorporating features of this invention.
Figure 21:
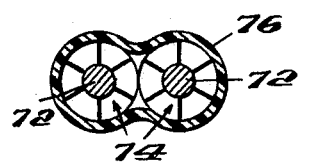
FIG. 21 is a schematic cross-section of an unshielded balanced twin lead communications line incorporating features of this invention.

While in all the foregoing disclosed embodiments, the ribs run parallel to the length of the ribbon, the present invention is not limited to such ribbon. Suitable ribbon can be made by the foregoing described apparatus, in which the ribs are inclined from or perpendicular to the length of the ribbon or form connected or disconnected patterns of polygonal shapes, such as rectangles, triangles or hexagons, or curvilinear shapes such as circles, by having corresponding grooves in the surface of the roll 108. FIGS. 16 and 17 show a ribbon 86 helically wrapped around an inner conductor 87, with the ribbon consisting of a film 88 and ribs 89 extending therefrom at an angle of about 80° with the length direction of the film. In this embodiment, the angle which the ribs make with the length direction of the ribbon is chosen so that the ribs run substantially parallel to the inner conductor 87 when the ribbon is helically wrapped therearound. The particular angle chosen to give this result will depend primarily on the diameter of the inner conductor and the helix angle of the wrap. Instead of helical channels, these ribs 89 form channels which extend substantially parallel to the axis of the inner conductor, with the channels being somewhat irregular from turn to turn in each layer of helical wrapping if the ribs thereof fail to line up. The path of air or dielectric fluid along the length of the cable is considerably shortened by this embodiment. FIGS. 18 and 19 show another embodiment of ribbon, namely ribbon 92 consisting of film 93, and a network of ribs 94 and 95 running parallel and perpendicular, respectively, to the length of the ribbon, helically wrapped around inner conductor 96. This embodiment of ribbon is useful when air or dielectric fluid flow is not requierd. These embodiments of ribbon can be used in different styles of wrapping and can be modified along the lines of FIG. 4 and/or FIG. 5. When a film 30 (FIG. 4) is laminated to the tops of ribs in a connected or network pattern, closed cells are formed between the film 30 and film of the ribbon.

The foregoing described ribbon-making apparatus and process makes precision ribbon, which after manufacture is the ribbon used in the conductor wrapping operation. In this sense, the material from which the insulation is to be made is preformed. This preforming and the precision involved therein lead to improved centering of the conductor within the insulation composed of the wrapped ribbon, which is particularly advantageous to good signal reproduction, such as desired for CATV, without sacrifice in flexibility or transverse strength or resilience.

Details illustrating the manufacture of ribbon for use in accordance with the present invention are as follows: The patterned roll has a six inch wide pattern in its surface consisting of grooves 0.010 inch wide x 0.050 inch deep and spaced about ⅛ inch apart running parallel to the direction of rotation of the roll. The roll is maintained at a temperature of about 80° C. and is rotated at a surface speed of about 20 ft./min. Linear polyethylene is formed at 275° C. and at a pressure of about 250 p.s.i.g. into the pattern of the roll from a pivotally mounted die having its outlet 128 and doctor blade 132 maintained about 0.004 inch from the roll during operation by a weight acting through a 30 inch lever arm. No mold release agent is used. The resultant web or ribbon consists of continuous film measuring about 0.004 inch in thickness and having integrally molded parallel ribs spaced ⅛ inch from each other, the ribs measuring 0.010 inch wide x 0.050 inch deep.

A ribbon is made in the same equipment but from 66 nylon instead of polyethylene, by operating the patterned roll ta 150° C. and a molding temperature of 270° C. and presure of 100 p.s.i.g.

The same equipment is used to make a ribbon from a copolymer of tetrafluoroethylene and hexafluoropropylene by operating the patterned roll at 190° C. and a molding temperature of 320° C. The copolymer is desired in Example V of U.S. Patent No. 3,085,083 to Schreyer (15% by wt. of hexafluoropropylene) containing about 88% $-CF_2H$ end groups and having a specific melt viscosity of about $9\times10^4$ poises at 380° C. The monomers are copolymerized in accordance with the procedure of Example I of U.S. Patent No. 2,946,763 to Bro et al.

A laminate is made from the polyethylene ribbon formed as just described by extruding a 0.004 inch polyethylene film from a film die at 275° C. onto a chill roll operating at 88° C. and forming a 0.056 inch nip with another roll and simultaneously passing the film and web, rib-side towards the film through the nip to thereby force the film against the tops of the ribs to form a laminate containing a core of parallel ribs.

A length of coaxial transmission line is made using a one inch wide ribbon of the polyethylene laminate just described. The ribbon is helically wrapped with abutting turns around a central conductor (0.5 inch in diameter) in seven layers, with the direction of wrap of each successive layer being reversed and with the turns of the layers being off-set from one another to prevent a straight-through path for dielectric breakdown. Each succeeding layer holds the previous layer in place. Aluminum foil is helically wrapped around the outermost layer of ribbon to serve as the shield conductor. The ends of this foil are held in place by taping. The dielectric constant and dissipation factor of the insulation structure (seven layers of ribbon containing air in the spaces between the ribs), as measured according to ASTM D150–65T, is 1.4 and 0.00003, respectively. When the same transmission line is made, except for the direction of helical wrap of each layer being in the same direction and the turns of the layers being ⅓ offset from one another, the line has a higher breakdown voltage.

A polyethylene ribbon 0.655 in. wide and consisting of a continuous film 0.004 in. thick and integrally molded parallel ribs 0.072 in. apart, 0.010 in. wide, and 0.050 in. deep is used to form a single layer of cigarette paper wrap around a central conductor 0.1 inch in diameter. The edges of the ribbon come together forming a butt joint and are heat bonded together. A helical wrapping of aluminum foil around the layer of ribbon is used to form the shield conductor.

In another example, a coaxial cable is constructed from a No. 12 AWG solid copper conductor extrusion coated with an 8 mil thick coating of polyethylene. The coated wire is heated to melt the coating and a linear polyethylene ribbon of the dimensions described in the preceding paragraph is wrapped in cigarette paper fashion about the coated wire, causing the ribs to be heat bonded to the coating. The edges of the ribbon come together, forming a ⅟₁₆ inch overlap which is heat bonded. A second layer of the same ribbon, except that it is 1⅟₁₆ inches wide, is wrapped the same way about the first layer and seamed by heat bonding; this layer is not bonded to the first layer. The shield conductor is a 0.005 inch thick x 1⅛ inches wide aluminum foil to which is heat-sealed a film of corresponding width x 0.002 inch thick film of an ionomer formed by copolymerizing ethylene with methacrylic acid to form a random copolymer containing 10 percent by weight of the acid derived groups which are then 50 percent neutralized with sodium ions. This coated foil is wrapped in cigarette paper fashion about the outer layer of ribbon to form a ⅟₁₆ inch overlap which is heat bonded. The cable is then passed through a heated tube to cause the coating on the foil to fuse to the film of the outer layer of ribbon.

The resultant cable exhibits an impedance of 73.4 ohms. To illustrate the transverse resilience of the cable, the cable is crushed, using pliers, before a detectable reflection appears by time-domain reflectometry measurements. Upon release by the pliers, the cable regains its thickness and the reflection fades almost completely, even though the imprint of the pliers is visible on the shield conductor. To illustrate flexibility, the cable is bent 180° around a smooth 2 inch radius curve and no reflection is detected. The cable has a minimum return loss of 30 db, indicating uniformity of construction. The impedance of the cable falls within ± 0.75 ohm, and the cable performs well at frequencies of 50 to 220 mHz and also at higher frequencies, including frequencies in the microwave region.

Generally, the ribs of the ribbon are uniformly spaced as far apart as possible to obtain low bulk densities yet while providing sufficient transverse strength. The strength requirement will be dictated by the wrapping style to be employed, i.e., helical or cigarette paper wrap, as well as by the number of layers of wrapping and the particular inner and shield conductors to be employed. Bulk densities for the rib stratum of the ribbon and for the whole molded ribbon can be less than 20% and 30%, respectively, and preferably less than 12% and 20%, respectively, of the density of the polymeric material from which the ribbon is made. Thus, the ratio of gas to solid insulation material, which is important in order to minimize dielectric constant, is high. Representative dimensions for ribbons which can be made by the process described hereinbefore are as follows, all dimensions being in inches:

| Width of Ribs | Height of Ribs | Spacing Between Ribs | Film Thickness |
|---|---|---|---|
| 0.004 | 0.025 | 0.073 | 0.0017 |
| 0.005 | 0.038 | 0.107 | 0.0025 |
| 0.006 | 0.056 | 0.150 | 0.0035 |
| 0.007 | 0.072 | 0.170 | 0.0040 |
| 0.010 | 0.050 | 0.140 | 0.0080 |
| 0.012 | 0.100 | 0.125 | 0.0075 |

The dielectric polymeric materials which are useful in making ribbon for use in the present invention are generally those which can be formed into the ribbon shape by such processes as extruding, molding or casting. For electrical character, the polymeric material should have a dielectric constant of less than 10 and preferably less than 5.5, a dissipation factor (energy loss) of no greater than 0.01 and preferably no greater than 0.001, and a DC resistivity of greater than $10^{10}$ ohm cm.

Suitable polymeric materials include natural and synthetic rubbers such as polyurethanes, polychloroprenes, EPT sulfur-curable elastomers such as described in U.S. Patent No. 2,933,480 to Gresham and Hunt, and copolymers of hexafluoropropylene with vinylidene fluoride and optionally tetrafluoroethylene; and thermoplastic resins, including polystyrene, -high impact polystyrene, ABS resin, the saturated hydrocarbon polymers, such as polyethylene, linear or branched, polypropylene and copolymers thereof; ionomers such as described in Canadian Patents 674,595 and 713,631, both to R. W. Rees; copolymers of ethylene with an $\alpha,\beta$-unsaturated carboxylic acid such as described in British Patent 936,380 to Du Pont, and blends thereof with saturated hydrocarbon polymers and such blends containing co-crystallized oxide water activated cross-linking agents; halogenated or perhalogenated olefin polymers, such as polymers of vinyl chloride, vinylidene chloride, chlorotrifluoroethylene, vinyl fluoride and vinylidene fluoride and melt fabricable tetrafluorethylene polymers, including such co-monomers as hexafluoropropylene, perfluoroalkyl vinyl ether, e.g., perfluoropropyl vinyl ether, or the monomer described and claimed in U.S. Patent No. 3,308,107 to Selman and Squire; polyvinyl acetate and copolymers thereof with saturated hydrocarbon polymers and optionally, the acid copolymers of British Patent 963,380 to Du Pont; polymers of $\alpha,\beta$-unsaturated carboxylic acid, such as polymethyl-methacrylate; the polyamides such as polyhexamethylene adipamide (66 nylon), polyhexamethylene sebacamide (610 nylon), polycaprolactam (6 nylon), copolymers, ionomers and/or saturated hydrocarbon polymers; polyoxymethylene polymer and copolymer; polycarbonate, polysulfone, and polyethylene terephthalate. These polymeric materials can contain any of the various additives used to modify the resin, such as antioxidants, fillers, reinforcing agents, such as fiber glass, hydrolytic and thermal stabilizers and colorants and flame retardents so long as the electrical requirements herein set forth are met. A particularly desirable flame retardent polymeric material for use in the present invention is the composition disclosed in U.S. Patent No. 2,480,298 to Happoldt; namely, at least 50 percent by weight polyethylene, 20 to 35 percent by weight antimony trioxide and at least 6 percent by weight chlorinated hydrocarbon (55 to 80 percent by weight Cl), the latter two components totalling 38 to 50 percent by weight of the composition.

The composition of the ribbon in any layer need not be the same as composition of the remaining layers of ribbon used for any particular transmission line. Thus, the inner layer(s) of ribbon can be of higher melting polymeric material, e.g., melt fabricable tetrafluoroethylene polymer, such as tetrafluoroethylene/hexafluoropropylene copolymer, and the outer layer(s) of ribbon can be a saturated hydrocarbon polymer, such as polyethylene. This aspect of the present invention is particularly useful in DC transmission lines.

The particular molding temperatures employed in making ribbon will depend upon such operating conditions as the speed of the patterned roll 108 and the intricacy of the pattern therein. Typical molding temperatures for some of the suitable resins are as follows: linear polyethylene 200–250° C.; branched polyethylene 180–190° C.; polypropylene 200–250° C.; polystyrene 240–280° C.; polyvinyl chloride 150–170° C.; and 66 nylon 260–350° C.

As many apparently widely different embodiments of this invention may be made without departing from the spirit and scope thereof.

What is claimed is:

1. A line for transmitting electrical energy, comprising a shield conductor, at least one inner conductor, and spacer structure for positioning said inner conductor within said shield conductor, said spacer structure comprising a plurality of layers of ribbon of dielectric polymeric material wrapped around said inner conductor, said ribbon composed of a continuous film and integrally molded therewith a plurality of ribs extending from at least one surface of said film, said ribbon having a bulk density of less than 30 percent of the density of said polymeric material, the wrapping of said ribbon being such as to divide the gap between said inner conductor and said outer conductor into at least three concentric spaces.

2. The transmission line of claim 1 wherein the wrapping of said ribbon around said inner conductor is helical and said ribs extend along the length of said ribbon.

3. The transmission line of claim 2 wherein the helical wrap is closed.

4. The transmission line of claim 3 wherein the film of the turns of the ribbon overlap one another.

5. The transmission line of claim 1 wherein another continuous film is laminated to the tops of said ribs.

6. The transmission line of claim 1 wherein said polymeric material is polyethylene.

7. The transmission line of claim 1 wherein said polymeric material is a copolymer of tetrafluoroethylene and hexafluoropropylene.

8. The transmission line of claim 1 wherein the wrapping of said ribbon is in cigarette paper fashion.

9. The transmission line of claim 1 wherein said ribs extend transverse to the length direction of said ribbon and the wrapping of said ribbon around said inner conductor is helical.

10. The transmission line of claim 9 wherein said ribs extend substantially parallel to the axis of said inner conductor.

11. The transmission line of claim 1 wherein the polymeric material has a dielectric constant of less than 5.5.

12. A line for transmitting electrical energy, comprising at least one inner conductor coated with dielectric polymeric material, at least one layer of ribbon of dielectric polymeric material wrapped around said inner conductor, said ribbon composed of a continuous film and integrally molded therewith a plurality of ribs extending from at least one surface of said film, said ribbon having a bulk density of less than 30 percent of the density of said polymeric material, and a jacketing around the outermost layer of said ribbon, the innermost layer thereof being heat-bonded to the coating of dielectric polymeric material.

13. A line for transmitting electrical energy, comprising a shield conductor, at least one inner conductor, and spacer structure for positioning said inner conductor within said shield conductor, said spacer structure comprising at least one layer of ribbon of dielectric polymeric material wrapped around said inner conductor, said ribbon composed of a continuous film and integrally molded therewith a plurality of ribs extending from at least one surface of said film, said ribbon having a bulk density of less than 30 percent of the density of said polymeric material, said ribs being transversely grooved to provide communication between the spaces on either side thereof.

14. A line for transmitting electrical energy, comprising a shield conductor, at least one inner conductor, and spacer structure for positioning said inner conductor within said shield conductor, said spacer structure comprising at least one layer of ribbon of dielectric polymeric material wrapped around said inner conductor in cigarette paper wrap fashion and seamed to itself by heat-bonding, said ribbon composed of a continuous film and integrally molded therewith a plurality of ribs extending from at least one surface of said film, said ribbon having a bulk density of less than 30 percent of the density of said polymeric material.

15. A line for transmitting electrical energy, comprising a shield conductor, at least one inner conductor, and spacer structure for positioning said inner conductor within said shield conductor, said spacer structure comprising at least two layers of ribbon dielectric polymeric material wrapped around said inner conductor, with at least one of said layers being composed of helically wrapped ribbon and at least one other of said layers being composed of ribbon wrapped in cigarette paper wrap fashion, said ribbon composed of a continuous film and integrally molded therewith a plurality of ribs extending from at least one surface of said film, said ribbon having a bulk density of less than 30 percent of the density of said polymeric material.

16. A line for transmitting electrical energy, comprising a shield conductor, at least one inner conductor, and spacer structure for positioning said inner conductor within said shield conductor, said spacer structure comprising a plurality of layers of ribbon of dielectric polymeric material wrapped in an open helix around said inner conductor, the layers being coextensive with one another, said ribbon composed of a continuous film and integrally molded therewith a plurality of ribs extending from at least one surface of said film, said ribbon having a bulk density of less than 30 percent of the density of said polymeric material.

17. A line for transmitting electrical energy, comprising a shield conductor, at least one inner conductor, and spacer structure for positioning said inner conductor within said shield conductor, said spacer structure comprising a plurality of layers of dielectric polymeric material wrapped around said inner conductor, said inner conductor being coated with dielectric polymeric material and the innermost layer of said dielectric polymeric material being heat-bonded to the coating of dielectric polymeric material, with the spacer structure having a portion which is moveable with respect to the innermost layer, said ribbon composed of a continuous film and integrally molded therewith a plurality of ribs extending from at least one surface of said film, said ribbon having a bulk density of less than 30 percent of the density of said polymeric material.

18. The transmission line of claim 17 wherein said shield conductor is coated with dielectric polymeric material and the outermost layer of said spacer structure is heat bonded to said coating on said shield conductor.

19. A line for transmitting electrical energy, comprising a shield conductor, at least one inner conductor, and spacer structure for positioning said inner conductor within said shield conductor, said spacer structure comprising at least one layer of ribbon of dielectric polymeric material wrapped around said inner conductor, said ribbon composed of a continuous film and integrally molded therewith a plurality of ribs forming a polygonal or curvilinear pattern extending from at least one surface of said film, said ribbon having a bulk density of less than 30 percent of the density of said polymeric material.

References Cited

UNITED STATES PATENTS

| | | | |
|---|---|---|---|
| 463,107 | 11/1891 | Degenhardt | 174—28 |
| 3,077,510 | 2/1963 | Olds | 174—25 |

FOREIGN PATENTS

| | | |
|---|---|---|
| 1,102,402 | 10/1955 | France. |
| 216,414 | 7/1961 | Austria. |
| 537,930 | 11/1931 | Germany. |

LEWIS H. MYERS, Primary Examiner

A. T. GRIMLEY, Assistant Examiner

U.S. Cl. X.R.

174—102, 110